(12) United States Patent
An et al.

(10) Patent No.: US 8,635,869 B2
(45) Date of Patent: Jan. 28, 2014

(54) TURBOCHARGING SYSTEM FOR INTERNAL COMBUSTION ENGINE

(75) Inventors: Byeongil An, Sagamihara (JP); Motoki Ebisu, Sagamihara (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/146,084

(22) PCT Filed: Sep. 15, 2009

(86) PCT No.: PCT/JP2009/066100
§ 371 (c)(1),
(2), (4) Date: Aug. 23, 2011

(87) PCT Pub. No.: WO2010/097979
PCT Pub. Date: Sep. 2, 2010

(65) Prior Publication Data
US 2011/0296828 A1    Dec. 8, 2011

(30) Foreign Application Priority Data

Feb. 27, 2009 (JP) ................................. 2009-045771

(51) Int. Cl.
*F02B 37/12* (2006.01)
(52) U.S. Cl.
USPC .......................................................... 60/600
(58) Field of Classification Search
USPC ................................................ 60/612, 605.2
See application file for complete search history.

(56) References Cited

U.S. PATENT DOCUMENTS

| 4,982,567 A | * | 1/1991 | Hashimoto et al. | 60/600 |
| 5,845,495 A | * | 12/1998 | Schray et al. | 60/612 |
| 6,158,219 A | * | 12/2000 | Mailander | 60/612 |

(Continued)

FOREIGN PATENT DOCUMENTS

| EP | 1519017 A1 | 3/2005 |
| FR | 2 904 365 A1 | 2/2008 |

(Continued)

OTHER PUBLICATIONS

JP 2005098250A English Machined Translation Attached.*

(Continued)

*Primary Examiner* — Thomas Denion
*Assistant Examiner* — Shafiq Mian
(74) *Attorney, Agent, or Firm* — Birch, Stewart, Kolasch & Birch, LLP (57) ABSTRACT

A two-stage turbo system provided with an internal combustion engine includes, two turbo-superchargers driven by exhaust gas from the engine, control valves for switching between the flow path of intake gas sucked into the engine and the flow path of exhaust gas, and a control device for controlling the control valves and the turbo-superchargers. The two turbo-superchargers have the same turbine capacity, function respectively as the high-pressure side turbo-supercharger on the exhaust path upstream side and the low-pressure side turbo-supercharger on the exhaust path downstream side, and have, by switching between the flow paths by using the control valves, a series mode in which the two turbo-superchargers are serially connected to each other, a one-stage supercharging mode in which gas flows only to the high-pressure-side turbo-supercharger or only to the low-pressure-side turbo-supercharger, and a parallel mode in which the two turbo-superchargers are connected in parallel to each other.

6 Claims, 12 Drawing Sheets

(56) References Cited

U.S. PATENT DOCUMENTS

| | | | |
|---|---|---|---|
| 7,461,508 B2 * | 12/2008 | Rosin et al. | 60/612 |
| 2006/0021347 A1 * | 2/2006 | Sun et al. | 60/612 |
| 2006/0042247 A1 | 3/2006 | Haugen | |
| 2008/0216795 A1 * | 9/2008 | Dietz et al. | 123/344 |

FOREIGN PATENT DOCUMENTS

| | | |
|---|---|---|
| JP | 58-190516 A | 11/1983 |
| JP | 61-291725 A | 12/1986 |
| JP | 1-160125 U | 11/1989 |
| JP | 4-17724 A | 1/1992 |
| JP | 4-164123 A | 6/1992 |
| JP | 6-229253 A | 8/1994 |
| JP | 6-48118 Y2 | 12/1994 |
| JP | 8-28287 A | 1/1996 |
| JP | 2005-98250 A | 4/2005 |
| JP | 2005098250 A * | 4/2005 |
| JP | 2005-315163 A | 11/2005 |
| JP | 2006-97684 A | 4/2006 |
| JP | 2007-263033 A | 10/2007 |
| JP | 2008-514842 A | 5/2008 |
| JP | 2008-133808 A | 6/2008 |
| JP | 2009-30493 A | 2/2009 |

OTHER PUBLICATIONS

Chinese Notification of Grant Patent Right issued in Chinese Application No. 200980157491.8 on Aug. 1, 2013.

Japanese Office Action mailed Aug. 30, 2012 for corresponding Japanese Application No. 2009-045771 with English translation.

Japanese Decision to Grant a Patent issued in Japanese Patent Application No. 2009-045771 on Jun. 25, 2013.

European Search Report issued in European Application No. 09840826.3 on Sep. 6, 2013.

* cited by examiner

TURBOCHARGING SYSTEM FOR INTERNAL COMBUSTION ENGINE

BACKGROUND OF THE INVENTION

1. Field of the Invention

The present invention relates to a turbocharging system for an internal combustion system equipped with an internal combustion engine and a plurality of turbochargers.

2. Description of the Related Art

As a conventional turbocharging system for an internal combustion engine equipped with an internal combustion engine and a plurality of turbochargers, there is a two-stage turbocharging system having a small size turbocharger on a high-pressure stage, and a large size turbocharger on a low-pressure stage. For instance, Patent Documents 1 and Patent Document 4 disclose a two-stage turbocharging system of this type.

Figure 8:
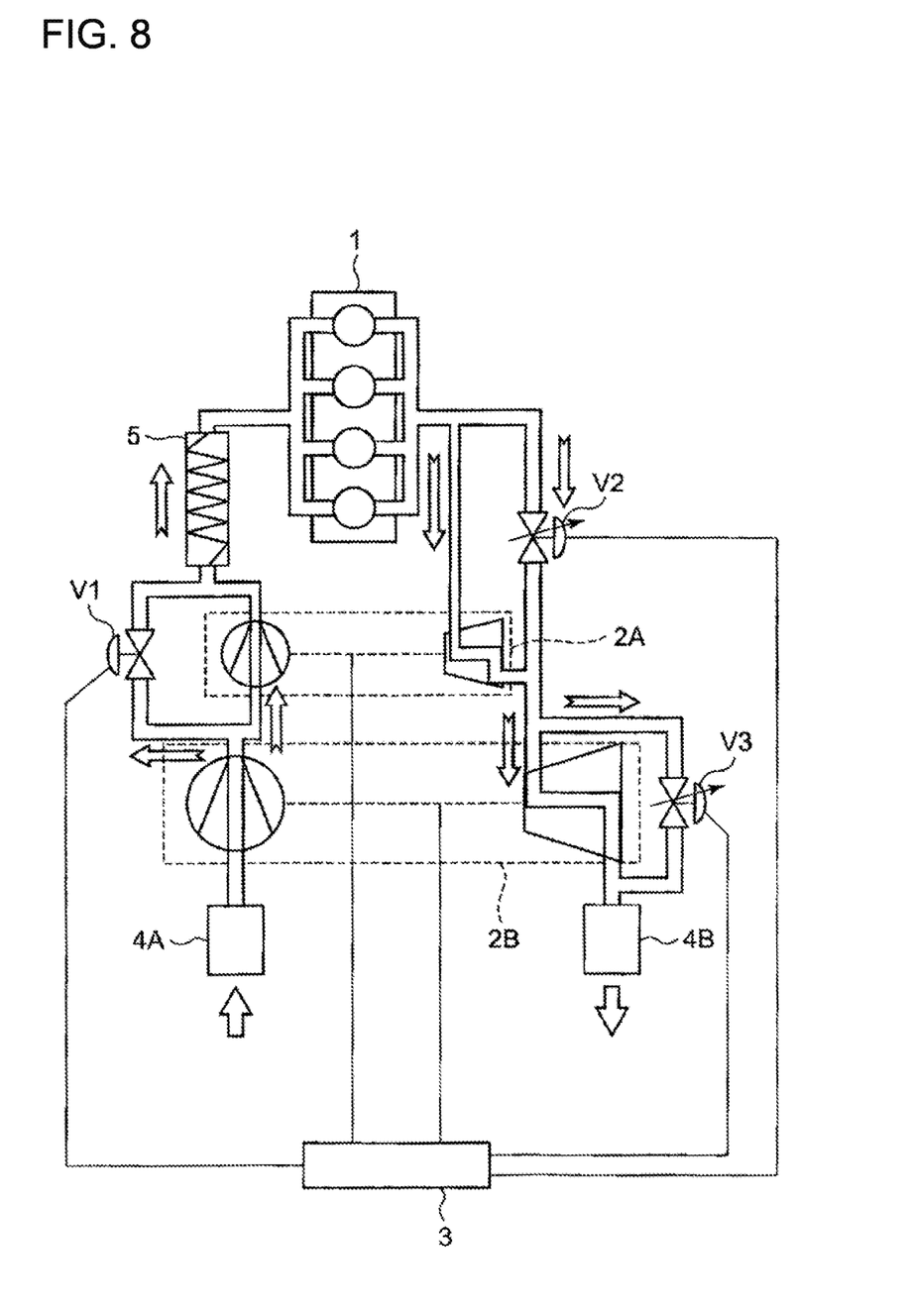
FIG. 8 is an illustrative drawing showing a conventional turbocharging system (two-stage turbocharging system) for an internal combustion engine.
Figure 12:
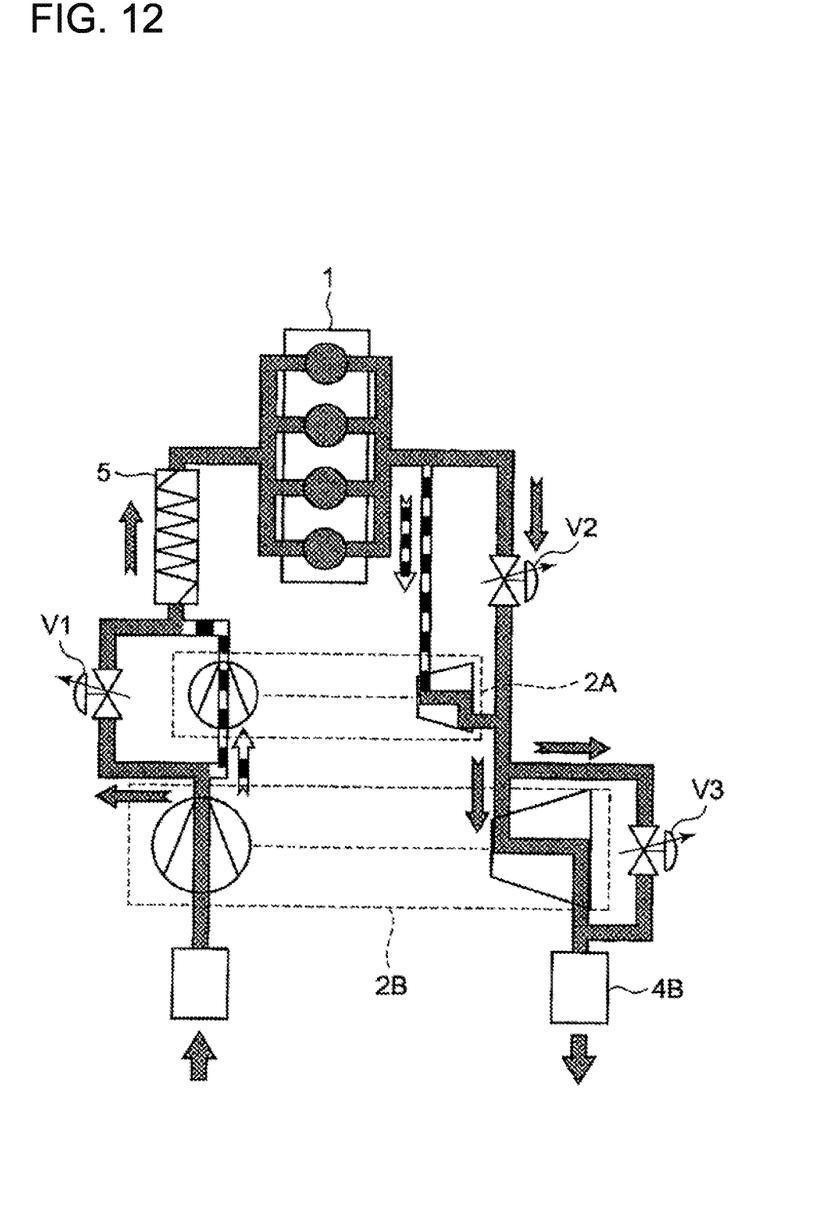
FIG. 12 is an illustrative drawing showing gas flow when the flow to the large size turbo is controlled by opening a wastegate valve.

An example structure of the conventional two-stage turbocharging system having the large size turbocharger and the small size turbocharger is explained in reference to FIG. 8 and FIG. 12. FIG. 8 illustrates an example of the conventional two-stage turbocharging system. As shown in the drawing, the conventional two-stage turbocharging system comprises an internal combustion engine 1, and two turbochargers 2A and 2B driven by exhaust gas from the internal combustion engine. The two-stage turbocharging system further comprises three control valves V1 to V3 for switching flow paths of intake gas drawn into the internal combustion engine 1 and flow paths of the exhaust gas from the internal combustion engine 1, and a control unit 3 which controls the control valves V1 to V3 and the turbocharger 2A and 2B. Herein, the control valves V1 to V3 respectively function as a bypass valve, flow control valve and a wastegate valve.

Further, the two-stage turbocharging system further comprises an intercooler 5 which is arranged on an upstream side of the internal combustion engine 1 (in an intake path) and cools the air having been heated by compression by the turbochargers while maintaining the pressure of the air. Furthermore, the two-stage turbocharging system comprises an air cleaner 4A which is arranged on the compressor side of the turbocharger 2B, and a muffler 4B. The air cleaned in the air cleaner 4A is fed to the turbocharger 2B and the exhaust gas from the turbochargers 2A and 2B is introduced to the muffler 4B.

Now, control patterns with use of the two-stage turbocharging system of the above configuration are explained hereinafter.

Figure 9:
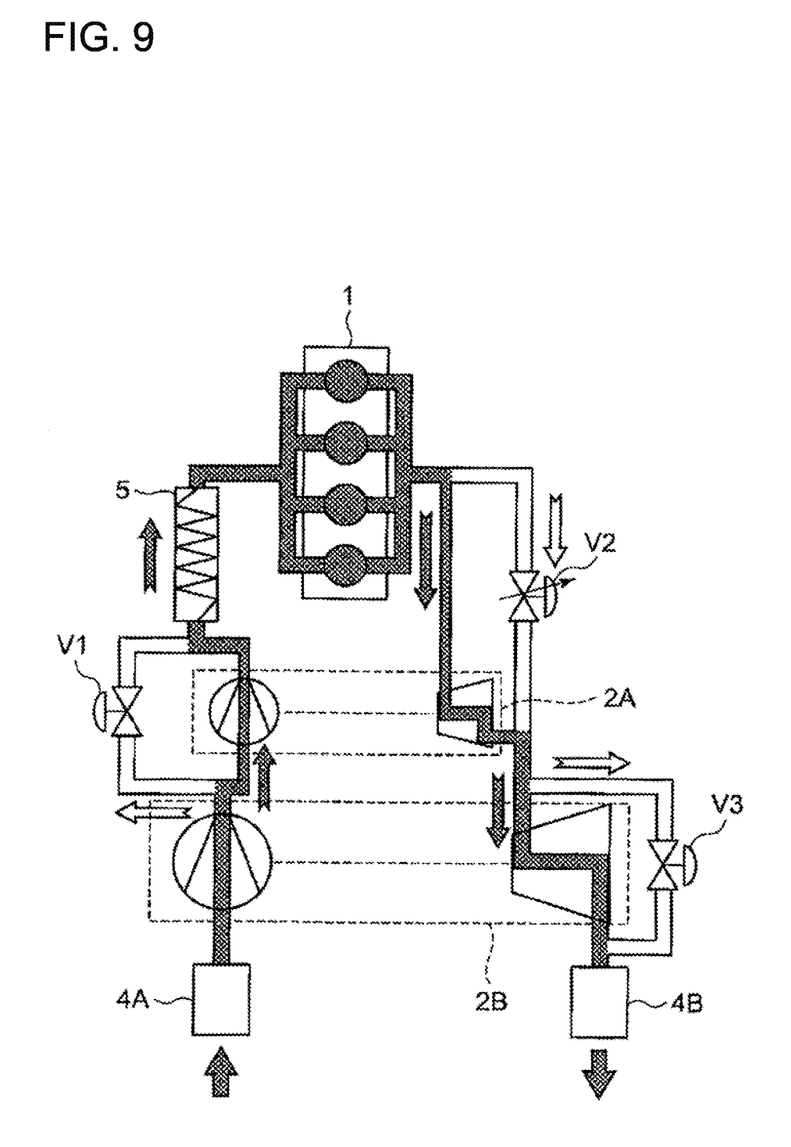
FIG. 9 is an illustrative drawing showing gas flow when a large size turbo and a small size turbo are arranged in series.

FIG. 9 illustrates a gas flow in a complete two-stage turbocharging state in which the rotation speed of the engine is approximately 1000 to 1250 rpm. In this state, all the control valves V1 to V3 are closed. And the intake air is introduced through the compressor side of the turbochargers 2A and 2B respectively and then fed into the intercooler 5. Next, the intake air is introduced into the internal combustion engine 1. The exhaust gas from the internal combustion engine 1 is discharged to outside of the system after passing through the turbine side of the turbochargers 2A and 2B respectively and the muffler 4B. In FIG. 9, the turbocharger 2A and the turbocharger 2B are connected in series and the turbocharger 2B is bigger than the turbocharger 2A.

Figure 10:
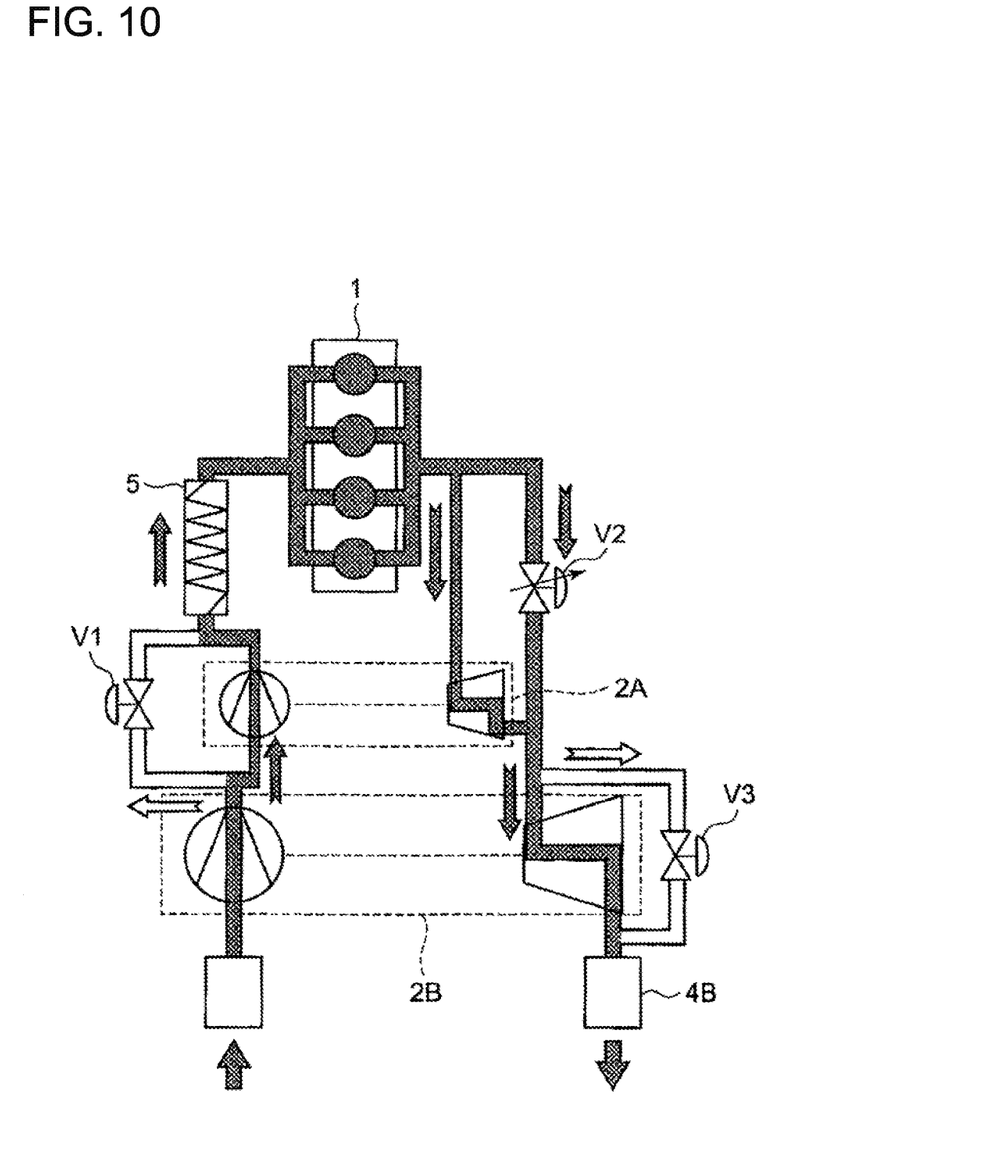
FIG. 10 is an illustrative drawing showing gas flow when the flow is controlled by opening a flow control valve.

FIG. 10 illustrates a gas flow in a variable two-stage turbocharging state in which the rotation speed of the engine is approximately 1250 to 2500 pm. In this state, the control valves V1 and V3 are closed and the control valve V2 is half-open. The control valve V2 is a flow control valve and thus the flow of the exhaust gas can be adequately controlled by changing the opening of the valve. With use of the control valve V2, the flow rate of the exhaust gas to the turbocharger 2A can be controlled, thereby controlling the turbine output. And the exhaust gas through the turbocharger 2A and the exhaust gas through the control valve V2 flow into one before entering the turbocharger 2B. The exhaust gas introduced to the turbocharger 2B is discharged to outside via the muffler 4B.

Figure 11:
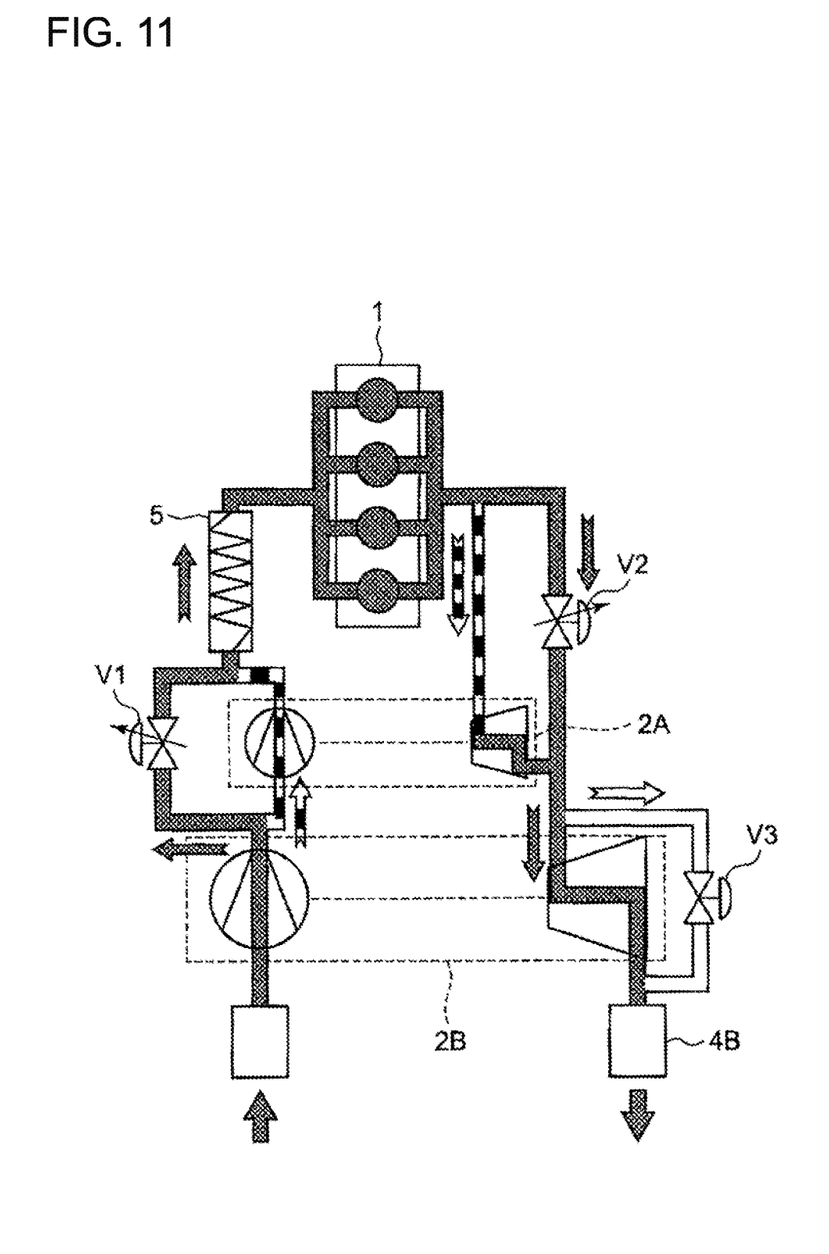
FIG. 11 is an illustrative drawing showing gas flow when the large size turbo is actuated and the small size turbo is in an idling state.

FIG. 11 illustrates a gas flow in such a state that the rotation speed of the engine is approximately 2500 to 3500 pm. In this state, the control valve V3 is closed and the control valves V1 and V2 are open. In this case, the flow paths having the control valves V1 and V2 have a larger cross-sectional area than the flow paths going through the turbocharger 2A, and thus a majority of the air and the exhaust gas flow through the flow paths having the control valves V1 and V2. As a result, the turbocharger 2A is not operated much and is in an idling state.

FIG. 12 illustrates a gas flow in such a state that the rotation speed of the engine is approximately 3500 rmp or above. In this state, the control valves V1 and V2 are full-open and the control valve V3 is half-open. The control valve V3 is controlled so as to control the flow rate of the exhaust gas to the turbine of the turbocharger 2B, thereby controlling the output of the turbocharger 2B.

As shown through FIG. 9 to FIG. 12, the internal combustion engine 1 is in the two-stage turbocharging state at a low/medium speed (1000 to 2500 rpm), and is in the one-stage turbocharging state at high speed (2500 rpm and above). In the one-stage turbocharging state, only the turbocharger 2B (low pressure turbo) is activated. Alternatively, only the turbocharger 2A (high pressure turbo) may be used instead of the turbocharger 2B in the single-state turbocharging state. As a result, this turbocharging system has a lot of flexibility to meet load change.

Moreover, the two-stage turbocharging system disclosed in Patent Document 4 operates both the turbines in series in a low speed/low load operation, and operates the turbines in parallel in a high speed/high load operation.

RELATED PATENT DOCUMENT

Patent Document

[PATENT DOCUMENT 1] JP 58-190516A
[PATENT DOCUMENT 2] JP 61-291725A
[PATENT DOCUMENT 3] JP 2006-097684A
[PATENT DOCUMENT 4] JP 2008-514842A
[PATENT DOCUMENT 5] JP 4-164123A

SUMMARY OF THE INVENTION

Object to be Achieved

In the conventional turbocharging system of the internal combustion engine as described above, even in the high speed/high load operation, the two-stage turbocharging is often required to achieve the target output. This generates the issue that the temperature of the compressor side rises and it is necessary to cool the turbochargers or change materials to meet the temperature rise. In the turbocharging system, higher output of the engine and improvement of the acceleration is desired along with a simple structure and a small size turbocharger with minimum inertia.

According to Patent Document 5, only the turbine side is controlled to switch an arrangement of the turbines between a series mode and a parallel mode. In the high speed operation of the engine, the flow into the turbines is adjusted by the wastegate valve while the compressor side still is in two-stage mode. As a result, it is difficult to control the flow in a stable manner.

In view of the problems above, an object of the present invention is to provide a turbocharging system for an internal combustion engine, which has a simple structure and is equipped with small size turbochargers.

Means to Solve the Problem

The present invention proposes a turbocharging system for an internal combustion engine, comprising: a plurality of turbochargers which are driven by exhaust gas from the internal combustion engine; flow path switching valves which respectively switch an intake flow path of intake gas drawn into the internal combustion engine and an exhaust flow path of the exhaust gas from the internal combustion engine; and a control unit which controls the flow path switching valves and the turbochargers, wherein the plurality of turbochargers include a first turbocharger arranged on a most downstream side in the exhaust flow path and a second turbocharger arranged on an upstream side of the first turbocharger in the exhaust flow path, and wherein the flow path switching valves respectively switch the intake flow path and the exhaust gas to select a mode from a series turbocharging mode, a one-stage turbocharging mode and a parallel turbocharging mode, the first turbocharger and the second turbochargers being connected in series when the series turbocharging mode is selected, only one of the first turbocharger and the second turbocharger being supplied with gas when the one-stage turbocharging mode is selected, the first turbocharger and the second turbocharger being connected in parallel when the parallel turbocharging mode is selected.

According to the present invention, two small size turbochargers are connected in series in the series turbocharging mode to control the transition from the complete two-stage to a variable two-stage. As a result, the responsiveness of the turbochargers is improved and this is advantageous in the acceleration of the engine. Further, the pair of the turbochargers is connected in parallel in the parallel turbocharging mode so as to appropriately meet the high flow needed in a control area of the high speed operation. Further, in the one-stage turbocharging mode, the gas is introduced to only one of the first turbocharger and the second turbocharger, which can be combined as needed, and this enables the fine control to achieve the target engine performance for the intended purpose. Moreover, pipes and the control valves are provided for controlling and thus, the structure is simple and not prone to a system failure.

It is preferable that the intake path to the internal combustion engine comprises: an intake serial passage which is connected to the internal combustion engine via a turbo compressor of the first turbocharger and a turbo compressor of the second turbocharger; an intake bypass passage which connects an exit side of the turbo compressor of the first turbocharger and an exit side of the turbo compressor of the second turbocharger; an intake parallel passage which is connected to a downstream side of an upstream connection point between the intake bypass passage and the intake serial passage and to the exit side of the turbo compressor of the second turbocharger; one of the flow path switching valves which is arranged at a connection point between the intake parallel passage and the intake serial passage; and an on/off valve which is arranged in the intake bypass passage, and the exhaust path from the internal combustion engine comprises: an exhaust serial passage which connects the internal combustion engine to outside through the second turbocharger and the first turbocharger; a first exhaust bypass passage which connects an entrance side of a turbine of the second turbocharger and an entrance side of a turbine of the first turbocharger; a second exhaust bypass passage which connects an upstream side of a connection point between the first exhaust bypass passage and the exhaust serial passage and an exit side of the turbine of the first turbocharger; one of the flow path switching valves which is arranged at an upstream connection point between the second exhaust bypass passage and the exhaust serial passage; and a flow control valve which is arranged in the first exhaust bypass passage.

In the present invention, the mode is selected from the series turbocharging mode, the parallel turbocharging mode and the one-stage turbocharging mode by simply switching the intake path and discharge path at the pair of control valves by the control unit. In particular, the flow control valve arranged in the first exhaust bypass passage controls the flow of the exhaust gas to the turbocharger on the high pressure side and to the turbocharger on the low pressure side. As a result, it is possible to meet the changing demand of the engine performance. For example, in the series turbocharging mode, the variable two-stage mode can be switched to the parallel turbocharging mode by controlling the flow control valve in accordance with the target turbocharging pressure. This is advantageous to improve the acceleration performance when passing a car in front.

It is also preferable in the present invention that the plurality of turbochargers has the same turbine capacity.

In the present invention, with use of two turbochargers having the same turbine capacity, if the series turbocharging mode is selected in the low speed/medium speed operation, two small size turbochargers are used instead of the combination of the large size turbocharger and the small size turbocharger like the conventional case, and thus the system can be downsized and obtain low inertia. Further, if the parallel turbocharging mode is selected when the large flow is needed, the pressure loss is reduced by maintaining an adequate pressure balance. As a result, the small size turbochargers can be used and the structure can be simplified.

In the present invention, the turbocharging system may further comprise: a low pressure turbo control passage which connects the first exhaust bypass passage on a downstream side of the flow control valve to a downstream side of the first turbocharger; and a flow control valve which is arranged in the low pressure turbo control passage.

According to the present invention, the low pressure turbo control passage is provided so as to finely control the amount of the exhaust gas to the turbocharger on the low pressure side.

In the present invention, the second turbocharger preferably includes a variable flow turbo.

According to the invention, the flow control valve of the variable flow turbocharger is closed in the acceleration performance of the engine so as to enhance the flow to an inside scroll and improve the responsiveness of the turbocharger. As a result, the acceleration performance of the engine is improved. Also, the opening of the flow control valve is adjusted so as to enlarge the control area in accordance to the engine operation status.

It is also preferable in the present invention that the second turbocharger includes a variable capacity turbo.

According to the invention, for example, the variable nozzles of the turbine are narrowed so as to reduce the flow of the exhaust gas in the turbine. And when the flow of the exhaust gas in the turbine is increased, it is advantageous for the high speed/high load operation. Further, the position of the nozzles can be controlled in accordance with the operation status and thus the fluctuation of the turbocharging is further suppressed.

It is also preferable in the present invention that the second turbocharger includes a twin scroll turbo.

In the invention, the responsiveness of the turbocharger on the low flow side during the acceleration of the engine is further enhanced, thereby improving the acceleration performance.

Effect of the Invention

In the turbocharging system for the internal combustion engine of the present invention, when the series turbocharging mode is selected, the supercharging pressure is increased and the responsiveness of the turbocharger is enhanced. This is advantageous for the acceleration of the engine. When the parallel turbocharging mode is selected, the flow of the intake air is increased and this is advantageous in the high speed/ high load operation. In contrast, in the conventional case using the large size turbocharger and the small size turbocharger, if the parallel mode is selected, an imbalance of the supercharging pressure occurs, thereby requiring adjustment of a check valve, pipes and so on. As a result, the number of parts is increased and the pressure loss is enhanced. However, in the preferred embodiment, none of the issues of the conventional cases is witnessed.

Further, a high-pressure stage mode and low-pressure stage mode except for the parallel turbocharging mode and the series turbocharging mode can be arbitrarily selected or combined so as to precisely achieve a target engine performance for the intended purpose. And the pipes and the control valves are provided for controlling and thus, the structure can be simplified and is unlikely to cause a system failure.

Furthermore, two turbochargers that have the same turbine capacity are used. Unlike the conventional case using the combination of the large size turbocharger and the small size turbocharger, two small size turbochargers are used and thus, the system can be downsized and low inertia is obtained.

DETAILED DESCRIPTION OF THE INVENTION

An embodiment of the present invention will now be described in detail with reference to the accompanying drawings. It is intended, however, that unless particularly specified, dimensions, materials, shape, its relative positions and the like shall be interpreted as illustrative only and not limitative of the scope of the present.

Figure 1:
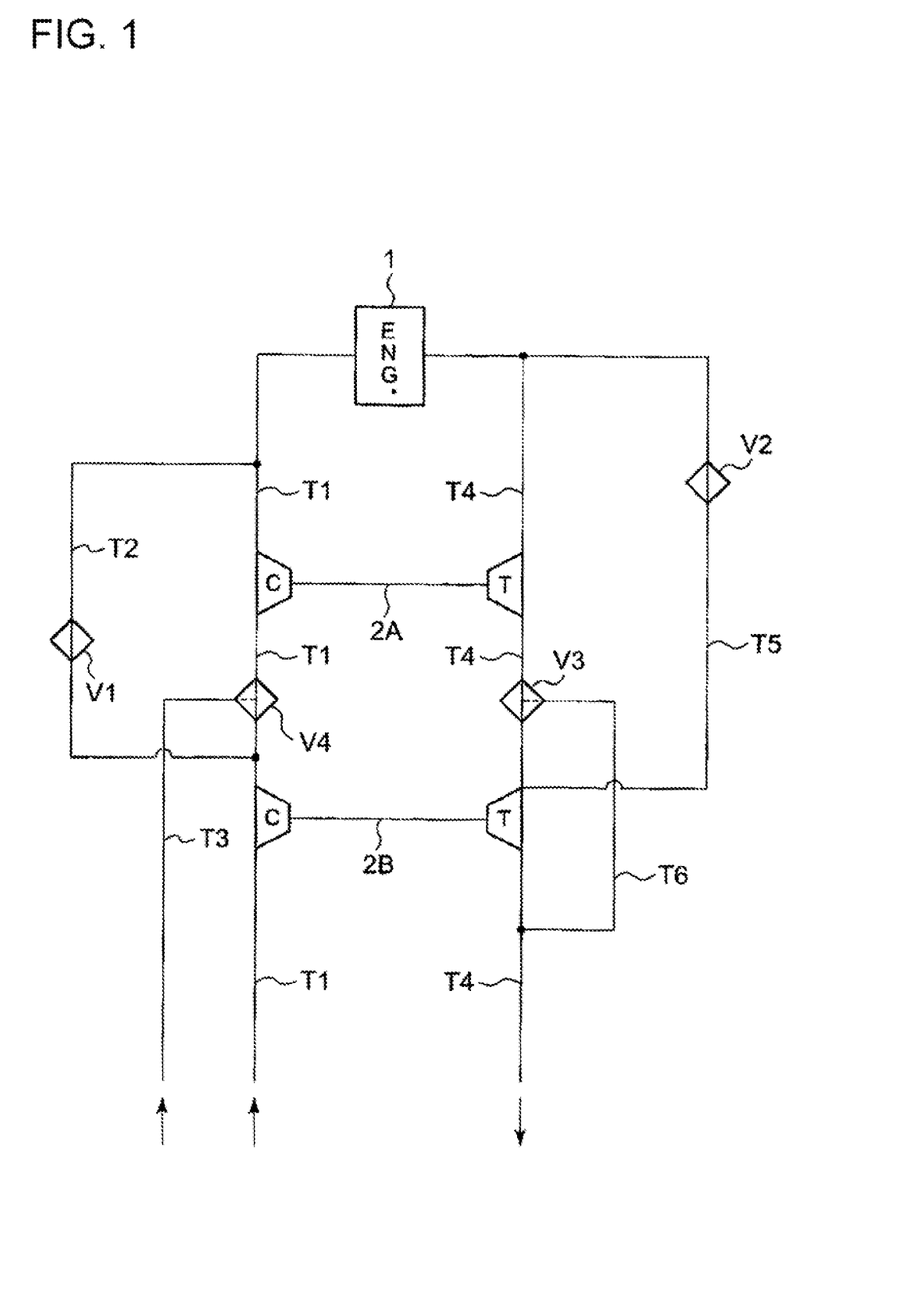
FIG. 1 is a schematic view illustrating one preferred embodiment of a turbocharging system for an internal combustion engine of the present invention.

FIG. 1 is a schematic view illustrating one embodiment of a turbocharging system (two-stage turbocharging system) for an internal combustion engine of the present invention. The turbocharging system of the embodiment comprises an internal combustion engine 1, and a first turbocharger 2A and a second turbocharger 2B which are driven by the exhaust gas from the internal combustion engine 1. The turbocharging system further comprises flow path switching valves V3 and V4 which switch the intake flow path of the intake gas drawn into the internal combustion engine 1 and the exhaust flow path of the exhaust gas from the internal combustion engine 1, a control unit (see reference number 3 of FIG. 3) which controls the flow path switching valves V3 and V4 and the turbochargers 2A and 2B. This control unit includes a computer for performing calculation, a DC power source for applying the current to coils of the control valves and so on.

The turbochargers 2A and 2B have the same turbine capacity. In the series turbocharging mode, the turbocharger 2A on the upstream side in the exhaust path functions as a high pressure turbocharger and the turbocharger 2B on a downstream side in the exhaust path functions as a low pressure turbocharger. The turbochargers herein may have the same turbine capacity. To maintain the pressure balance set by the number of cylinders and a shape and a length of an exhaust manifold, it is possible to modify diameter of wheels on the compressor side, a scroll or a variable mechanism.

The air is introduced as the intake gas into a combustion chamber of the internal combustion engine 1. The exhaust gas is discharged from the combustion chamber of the internal combustion engine 1. The flow path having the control valves can be split into the intake path and the exhaust path.

Now, the intake path is explained. The intake path comprises an intake serial passage T1 and an intake bypass passage T2. The intake serial passage T1 is connected to the internal combustion chamber 1 via a turbo compressor of the turbocharger 2B on the low pressure side and a turbo compressor of the turbocharger 2A on the high pressure side and the intake bypass passage T2 connects the exit side of the turbo compressor of the turbocharger 2A on the high pressure side and the exit side of the turbo compressor of the turbocharger 2B on the low pressure side. The intake path further has an intake parallel passage T3 which is connected on the downstream side of a connection point between the intake bypass passage T2 and the intake serial passage T1 and connected to the exit side of the turbo compressor of the turbocharger 2A on the high pressure side.

Further, the intake path further comprises the flow path switching valve V4 arranged at a connection point between the intake parallel passage T3 and the intake serial passage T1 and an on-off valve V1 arranged in the intake bypass passage T2. The on-off valve V1 and the flow path switching valve V4 function as bypass valves. As the on-off valve V1, a proportional control valve is used to control the flow rate in a continuous manner. Furthermore, the flow path switching valve V4 is an on-off two-way valve which simply switches flow paths and is not capable of controlling the flow rate.

Next, the exhaust path is explained. The exhaust path from the internal combustion engine 1 comprises: an exhaust serial passage T4 which connects the internal combustion engine 1 to outside (e.g. to the outside air or to the muffler) through the turbocharger 2A on the high pressure side and the turbocharger 2B on the low pressure side; a first exhaust bypass passage T5 which connects an entrance side of a turbine of the turbocharger 2A on the high pressure side and an entrance side of a turbine of the turbocharger 2B on the low pressure side; a second exhaust bypass passage T6 which connects an upstream side of a connection point between the first exhaust bypass passage T5 and the exhaust serial passage T4 and an exit side of the turbine of the turbocharger 2B on the low pressure side. The first exhaust bypass passage T5 may be directly connected to entrance of the upstream side of the turbocharger 2B or connected to the exhaust serial passage T4.

Furthermore, the exhaust path further comprises the flow path switching valve V3 arranged at an upstream connection point between the second exhaust bypass passage T6 and the exhaust serial passage T4; and a flow control valve V2 which is arranged in the first exhaust bypass passage T5. The flow switching valve V3 functions as a bypass valve and the flow control valve V2 functions as a flow control valve. The flow switching valve V3 is an on-off two-way valve which simply switches flow paths and is not capable of controlling the flow rate. As the flow control valve V2, a proportional control valve is used to control the flow rate in a continuous manner.

Figure 2:
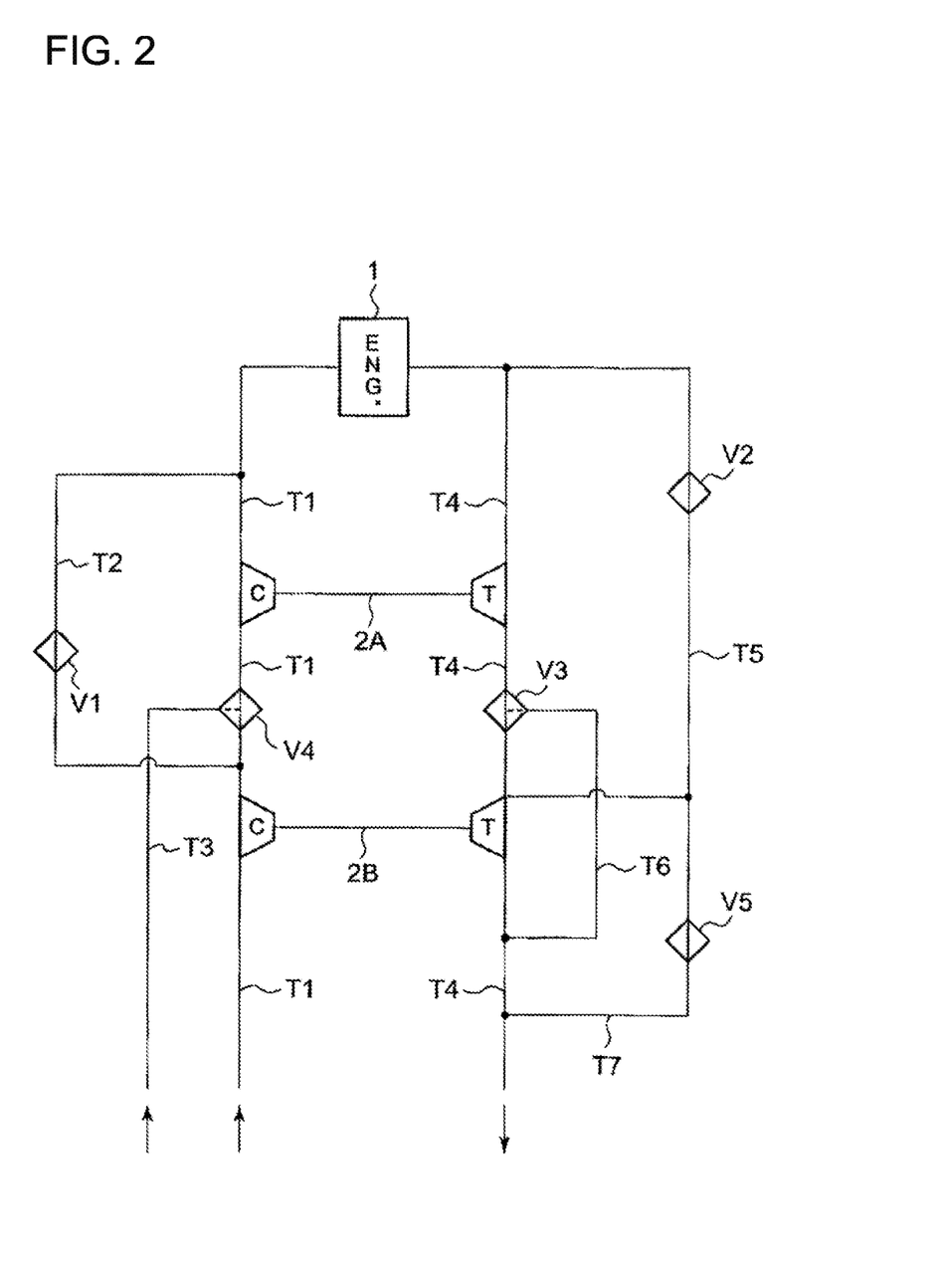
FIG. 2 is a schematic view illustrating a modification of the turbocharging system for the internal combustion engine of FIG. 1.

Now, the two-stage turbocharging system illustrated in FIG. 2 comprises a low pressure turbo control passage T7 which connects the first exhaust bypass passage T5 on a downstream side of the flow control valve V2 to a downstream side of the turbocharger 2B on the low pressure side. Further, a proportional on-off valve V5 is arranged in the low pressure turbo control passage T7. The proportional on-off valve V5 performs a fine control of the flow rate of the exhaust gas to the low pressure turbo control passage T7. The proportional on-off valve functions as a wastegate valve.

In the two-stage turbocharging system of the embodiment as shown in FIG. 1 and FIG. 2, the flow path switching valves V1 to V4 switch the flow paths to select a mode from a series turbocharging mode, a one-stage turbocharging mode and a parallel turbocharging mode, the turbochargers 2A and 2B being connected in series when the series turbocharging mode is selected, only one of the turbochargers 2A and 2B being supplied with the exhaust gas when the one-stage turbocharging mode is selected, the turbochargers 2A and 2B being connected in parallel when the parallel turbocharging mode is selected.

Figure 3:
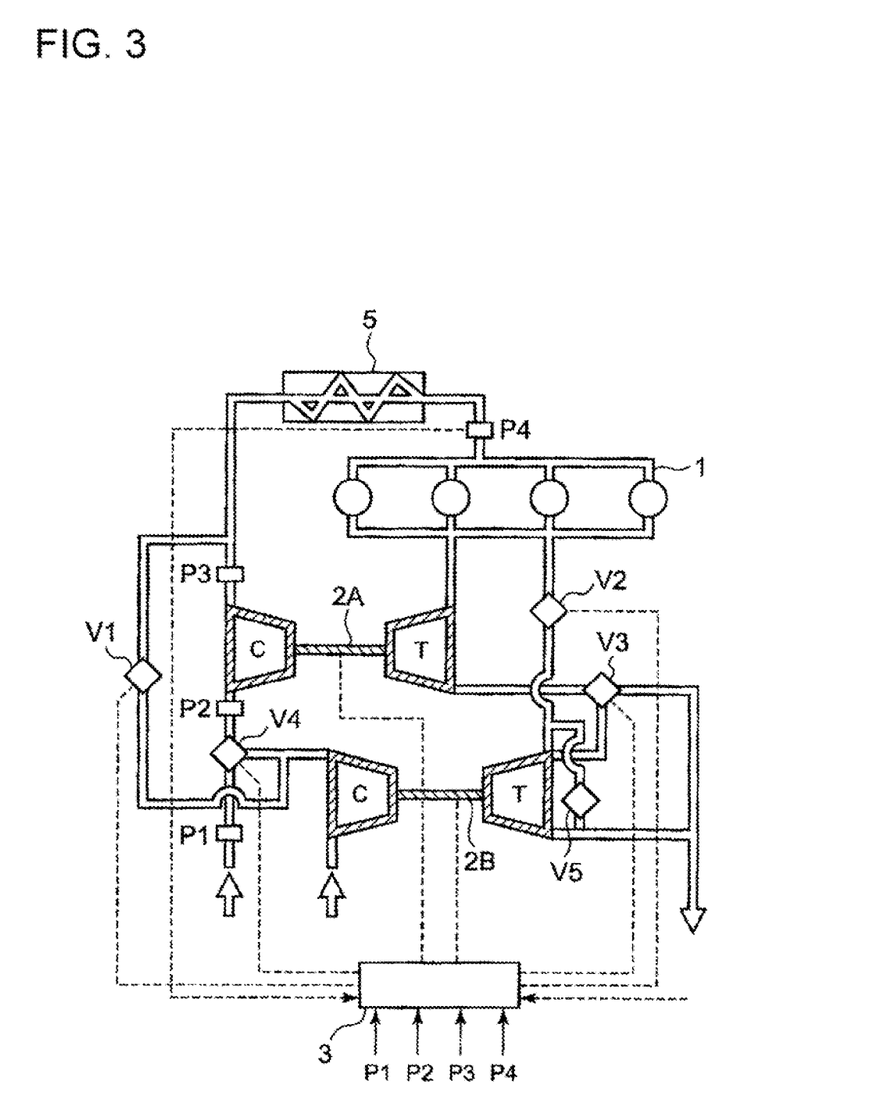
FIG. 3 is an illustrative drawing showing the turbocharging system of FIG. 2 in detail.

FIG. 3 is an illustrative drawing showing the two-stage turbocharging system of FIG. 2 in detail. As shown in the drawing, in addition to the configuration of FIG. 2, the two-stage turbocharging system further comprises a control unit 3 for controlling the turbochargers 2A and 2B and the control valves V1 to B5, and an intercooler 5 for cooling the air drawn into the inter combustion engine 1. The control unit 3 receives outputs from pressure sensors P1 to P4 arranged in the flow path to appropriately control the control valves V1 to V5.

Figure 4:
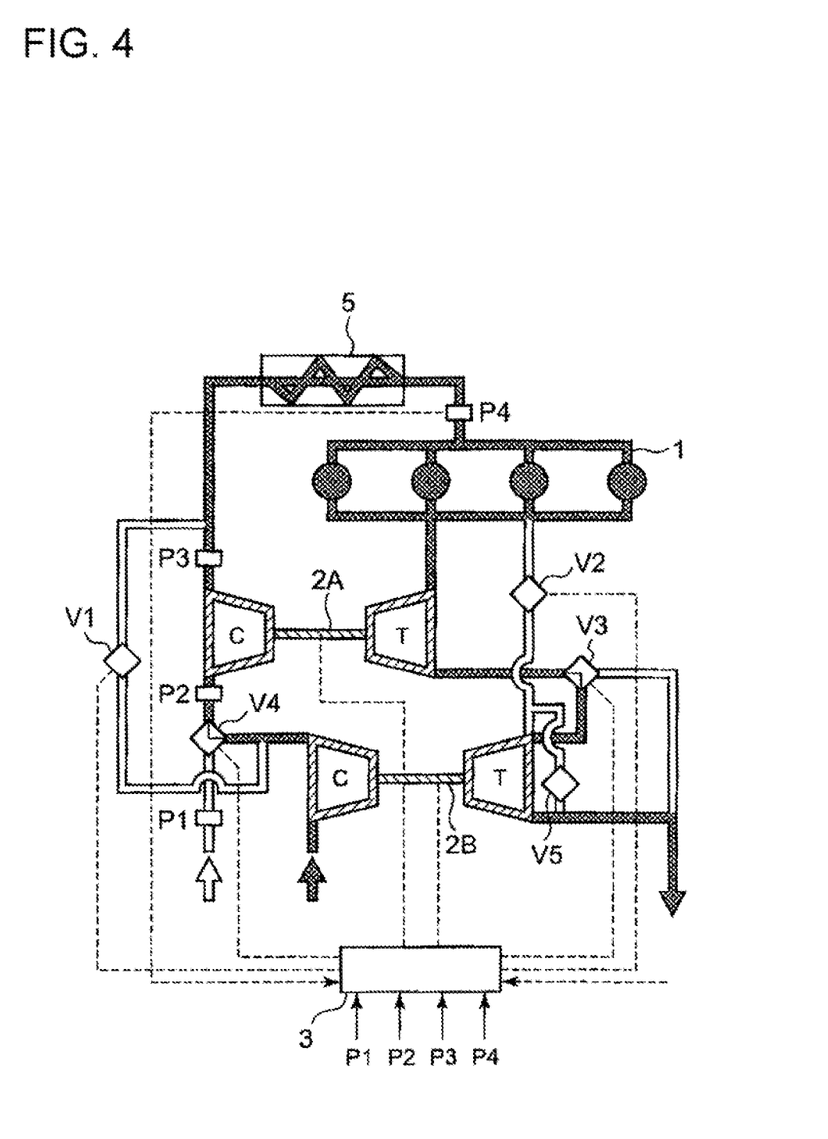
FIG. 4 is an illustrative drawing showing a series turbocharging mode in which two turbochargers are arranged in series.

FIG. 4 is an illustrative drawing showing the gas flow in the series turbocharging mode in which two turbochargers 2A and 2B are arranged in series. As shown in the drawing, the air passes through the turbocharger 2B and the turbochargers 2A in this order, and into the internal combustion engine 1 through the intercooler 5. Then, the exhaust gas from the internal combustion engine 1 is fed to the turbocharger 2A and discharged to outside via the flow path switching valve V3 and the turbocharger 2B.

Figure 5:
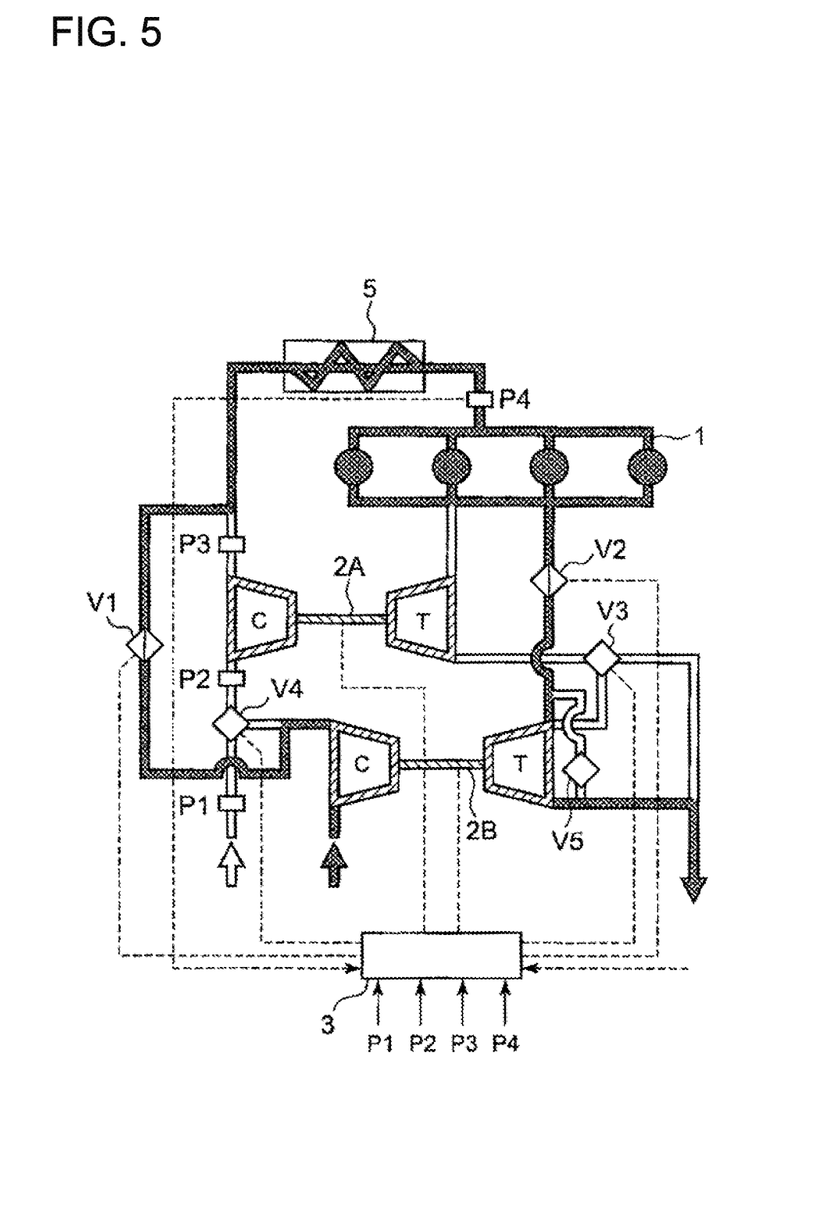
FIG. 5 is an illustrative drawing showing a one-stage turbocharging mode (low pressure stage mode) in which the gas is fed only to a low pressure turbo.

FIG. 5 is an illustrative drawing showing the gas flow in the one-stage turbocharging mode in which the gas is fed to only one of the turbochargers 2A and 2B. The turbochargers 2A and 2B have the same turbine capacity and thus either one can be used. This mode is selected to perform partial load of the engine. For instance, the air is introduced only the turbocharger 2B of the low pressure side and then introduced to the internal combustion engine 1 through the intercooler 5. Then the exhaust gas from the internal combustion engine 1 is introduced to the turbocharger 2B via the flow control valve V2, and then discharged to outside. In this mode, the proportional on-off valve V5 is adequately opened (the opening of the valve is on/off, or proportionally adjusted) to control the flow rate of the exhaust gas to the turbocharger 2B.

Figure 6:
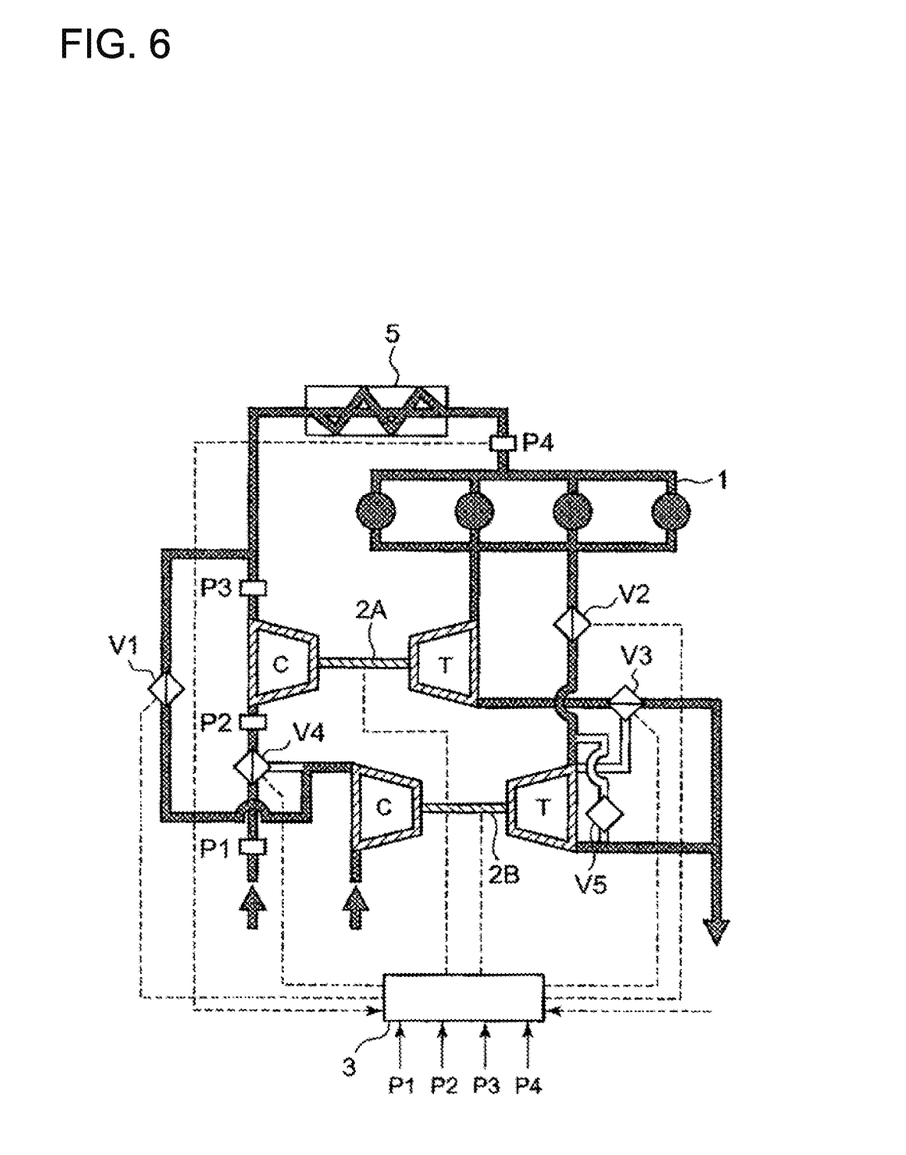
FIG. 6 is an illustrative drawing showing a parallel turbocharging mode in which two turbochargers are arranged in parallel.

FIG. 6 is an illustrative drawing showing the gas flow in the parallel turbocharging mode in which two turbochargers 2A and 2B are arranged in parallel. As shown in the drawing, the air from both flow passages is merged into the turbocharging system. The pair of the passages are connected to the turbocharger 2A on the low pressure side and the turbocharger 2B on the high pressure side respectively. The air having passed through the turbochargers 2A and 2B is merged and fed to the internal combustion engine 1 via the intercooler 5. And the exhaust gas from the internal combustion engine 1 is split into the passage to the turbocharger 2A on the high pressure side and to the turbocharger 2B on the low pressure side, i.e. introduced in parallel. The exhaust gas having passed through the turbochargers 2A and 2B is joined to be discharged to outside.

Figure 7:
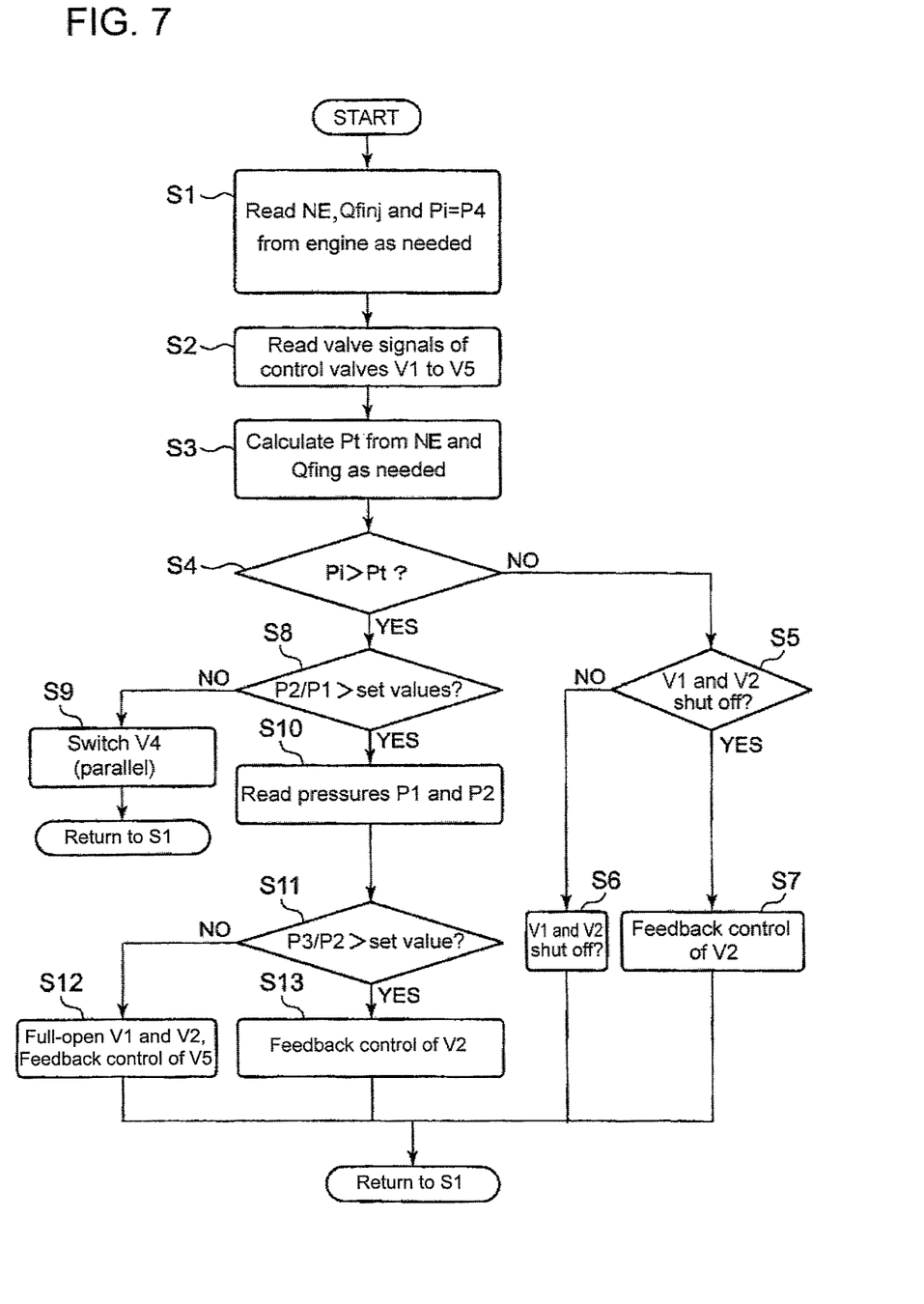
FIG. 7 is a flow chart illustrating a process of controlling control valves in transition to the series turbocharging mode.

FIG. 7 is a flow chart illustrating a process of controlling the control valves in transition to the series turbocharging mode.

First, the rotation speed of the engine (NE), the fuel injection amount (Qfinj) and a current turbocharging pressure (Pi=P4) in the internal combustion engine 1 of FIG. 3, are read as needed in step S1. In step S2, valve signals from the control valves V1 to V5 are read. Next, in step S3, a target turbocharging pressure (Pt) is calculated from the rotation speed of the engine (NE) and the fuel injection amount (Qfinj) as needed.

In step S4, it is determined whether or not Pi is greater than Pt. If Pi is not greater than Pt, it is determined whether or not if the control valves V1 and V2 are shut off in a step S5. If the control valves V1 and V2 are not shut off, the process advances to step S6 to shut off the control valves and then the process returns to step S1. Meanwhile, if the control valves V1 and V2 are shut off, the process advances to step S7 in which a feedback control of the flow control valve V2 is performed so as to control the flow rate and ratio to the turbochargers 2A and 2B. After step S7, the process returns to step S1.

If it is determined that Pi is greater than Pt in step S4, the process advances to step S8 to determine whether or not P2/Pi is greater than a set value. If P2/P1 is not greater than the set value, the process advances to step S9 to switch the control valve V4 to arrange the turbochargers 2A and 2B in parallel. After step S9, the process returns to step S1. Meanwhile, if P2/P1 is greater than the set value, the process advances to step S10 to read pressure values of the pressure sensors P1 and P2.

Next, in step S11, it is determined whether or not P3/P2 is greater than a set value. If P3/P2 is not greater than the set value, the control valves are fully opened in step S12 and the control valves V3 and V4 are switched into the parallel mode to perform the feedback control of the control valve V5 to perform fine control of the flow rate of the exhaust gas to the turbocharger 2B. After step S12, the process returns to step S1. In contrast, if P3/P2 is greater than the set value, the feedback control of the control valve V2 is performed in step S13 to control the flow rate and ratio to the turbochargers 2A and 2B. Then the process returns to step S1.

In the two-stage turbocharging system of the embodiment, both of the turbochargers 2A and 2B have the same turbine capacity and thus, instead of the conventional combination of a large turbo and a small turbo, a combination of two small turbochargers is adopted, thereby achieving more compact and lower inertial system. Further, in the series turbocharging mode, the turbocharging pressure rises and the responsiveness of the turbochargers 2A and 2B is enhanced, which is advantageous during the acceleration. Furthermore, in response to the increased rotation speed of the engine, when more air is needed, the parallel turbocharging mode is selected so as to increase the flow of the intake air, which is advantageous during the high speed/high load operation. In the conventional case adopting the combination of the large turbo and the small turbo, when the parallel turbocharging mode is selected, the balance of the turbocharging pressure occurs, and a check valve must be installed to prevent it. This can increase the number of parts and enhance the pressure loss. However, in the preferred embodiment, none of the issues of the conventional cases is witnessed.

Further, the modes of the one-stage turbocharging mode except for the parallel turbocharging mode and the series turbocharging mode can be arbitrarily selected or combined so as to precisely achieve a target engine performance on the intended use. And the pipes and the control valves are provided for controlling and thus, the structure can be simplified and is unlikely to cause a system failure.

Furthermore, in the two-stage turbocharging system of the embodiment, the mode can be selected from the series turbocharging mode, the parallel turbocharging mode and one-stage turbocharging mode with such a simple structure (see FIG. 1) in which the control valves V1 to V4 are arranged in the intake path and the exhaust path and switched by the control unit. In particular, the flow of the exhaust gas to the turbocharger 2A on the high pressure side and the turbocharger 2B on the low pressure side is controlled by the control valve V2 arranged in the first exhaust bypass passage T5. In this manner, the system can appropriately respond to a change of the requested engine performance. For instance, in the series turbocharging mode, the flow control valve V2 is controlled (on/off control and opening amount control) with respect to the target turbocharging pressure to perform the control to change the mode from a variable two-stage mode to the parallel turbocharging mode. This is advantageous during the acceleration when passing a vehicle in front can be improved.

While the present invention has been described with reference to exemplary embodiments, it is to be understood that the invention is not limited to the disclosed exemplary embodiments and that modifications and variations are possible within the scope of the invention.

For instance, it is preferable to use a variable geometry turbocharger (VGT) as the turbocharger 2A on the high pressure side. The variable geometry turbocharger is capable of changing the turbine capacity. In the variable geometry turbocharger, the throat area on the turbine side is reduced by choking variable vanes during the low speed operation of the internal combustion engine. As a result, the flow speed of the exhaust gas is increased, thereby improving the responsiveness. Also, this enables a fine control in accordance to the load change of the engine. Further, it is preferable to use a variable flow turbocharger (VFT) as the turbocharger 2A on the high pressure side. By this, the flow rate of the variable flow turbocharger can be reduced, resulting in improving the responsiveness of the turbocharger in the manner similar to the variable geometry turbocharger. This is advantageous during the low speed/low load operation. Furthermore, the variable geometry turbocharger is different from the variable flow turbocharger in that it has a turbine which is divided into two portions inside and outside thereof, is not capable of finely adjusting the throat area, but has a simple structure.

Moreover, for instance, a twin scroll turbocharger can be used as the turbocharger 2A on the high pressure side. By this, the flow speed can be faster during the acceleration of the engine than the case of using the regular turbine scroll, thereby improving the responsiveness of the turbocharger.

In the embodiment, the supply shut-off valve V1 is used. However, it is also possible to use an on-off switching valve which has a simple structure is low-cost, or a proportional on-off valve which proportional adjust the valve between on-off in a continuous manner.

Further, the flow path switching valves V3 and V4 are explained in the embodiment. It is preferable to use a two-way valve as the flow switching valves V3 and V4. The two-way valve has a simple structure and is low-cost. Needless to say, it is possible to use three-way valves, four-way valves and so on.

INDUSTRIAL APPLICABILITY

In the two-stage turbocharging system of the present invention, it is possible to provide use small size turbochargers and also to simplify the structure thereof. The present invention can be applied to all of vehicles, vessels and aircrafts that are equipped with turbochargers.

The invention claimed is:

1. A turbocharging system for an internal combustion engine, comprising:
   a plurality of turbochargers which are driven by exhaust gas from the internal combustion engine;
   flow path switching valves which respectively switch an intake flow path of intake gas drawn into the internal combustion engine and an exhaust flow path of the exhaust gas from the internal combustion engine; and
   a control unit which controls the flow path switching valves and the turbochargers,
   wherein the plurality of turbochargers include a first turbocharger arranged on a most downstream side in the exhaust flow path and a second turbocharger arranged on an upstream side of the first turbocharger in the exhaust flow path, and
   wherein the intake path of intake gas drawn into the internal combustion engine comprises:
      an intake serial passage which is connected to the internal combustion engine via a turbo compressor of the first turbocharger and a turbo compressor of the second turbocharger;
      an intake bypass passage which connects an exit side of the turbo compressor of the first turbocharger and an exit side of the turbo compressor of the second turbocharger;
      an intake parallel passage which is connected to a downstream side of an upstream connection point between the intake bypass passage and the intake serial passage and introduces the intake air;
a flow path switching valve which is arranged at a connection point between the intake parallel passage and the intake serial passage and switch the intake flow path only; and
an on/off valve which is arranged in the intake bypass passage, wherein the exhaust path of exhaust gas from the internal combustion engine comprises:
an exhaust serial passage which connects the internal combustion engine to outside through the second turbocharger and the first turbocharger;
a first exhaust bypass passage which connects an entrance side of a turbine of the second turbocharger and an entrance side of a turbine of the first turbocharger;
a second exhaust bypass passage which connects to an upstream side of a downstream connection point between the first exhaust bypass passage and the exhaust serial passage and an exit side of the turbine of the first turbocharger;
a flow path switching valve which is arranged at an upstream connection point between the second exhaust bypass passage and the exhaust serial passage and switch the exhaust flow path only; and
a flow control valve which is arranged in the first exhaust bypass passage and is capable to control the flow rate in a continuous manner, wherein four valves including: flow path switching valves, each of which being arranged in the intake flow path and the exhaust flow path; the on/off valve; and the flow control valve, switch the intake flow path and the exhaust flow path and control the flow rate to select a mode from a series turbocharging mode, a one-stage turbocharging mode, a parallel turbocharging mode, and a variable two-stage mode, the first turbocharger and the second turbochargers being connected in series when the series turbocharging mode is selected, only one of the first turbocharger and the second turbocharger being supplied with gas when the one-stage turbocharging mode is selected, the first turbocharger and the second turbocharger being connected in parallel when the parallel turbocharging mode is selected, the flow of the exhaust gas to the first turbocharger and the second turbocharger being variable-controlled in the series turbocharging when the variable two-stage mode is selected.

2. The turbocharging system for the internal combustion engine according to claim 1, wherein the plurality of turbochargers have the same turbine capacity.

3. The turbocharging system for the internal combustion engine according to claim 1, further comprising:
a low pressure turbo control passage which connects the first exhaust bypass passage on a downstream side of the flow control valve to a downstream side of the first turbocharger; and
a flow control valve which is arranged in the low pressure turbo control passage.

4. The turbocharging system for the internal combustion engine according to claim 1, wherein the second turbocharger includes a variable flow turbo.

5. The turbocharging system for the internal combustion engine according to claim 1, wherein the second turbocharger includes a variable capacity turbo.

6. The turbocharging system for the internal combustion engine according to claim 1, wherein the second turbocharger includes a twin scroll turbo.

* * * * *